July 31, 1928.
A. E. BROWN
1,679,069
MAGNETO ELECTRIC MACHINE
Filed Jan. 19, 1920
2 Sheets-Sheet 1
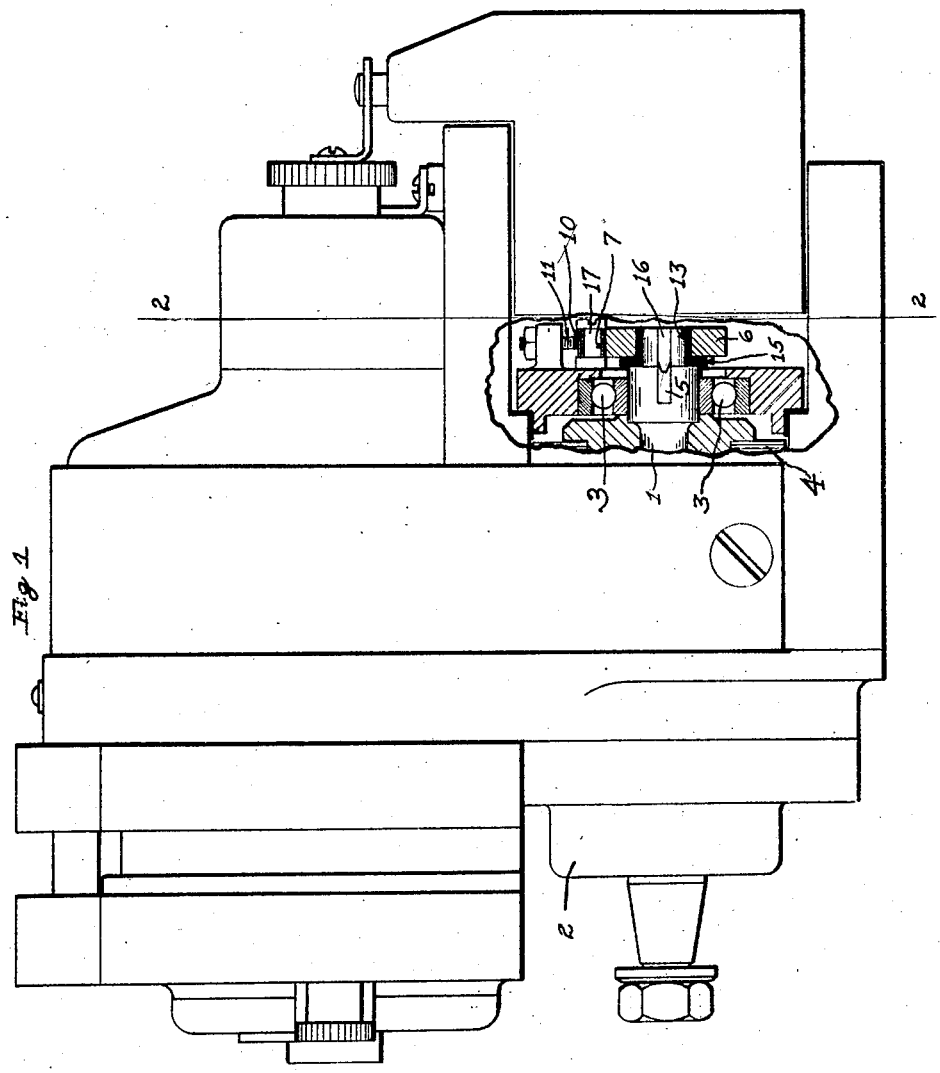
INVENTOR
Avery E. Brown
BY Frank C. Curtis
ATTORNEY July 31, 1928.  1,679,069
A. E. BROWN
MAGNETO ELECTRIC MACHINE
Filed Jan. 19, 1920   2 Sheets-Sheet 2
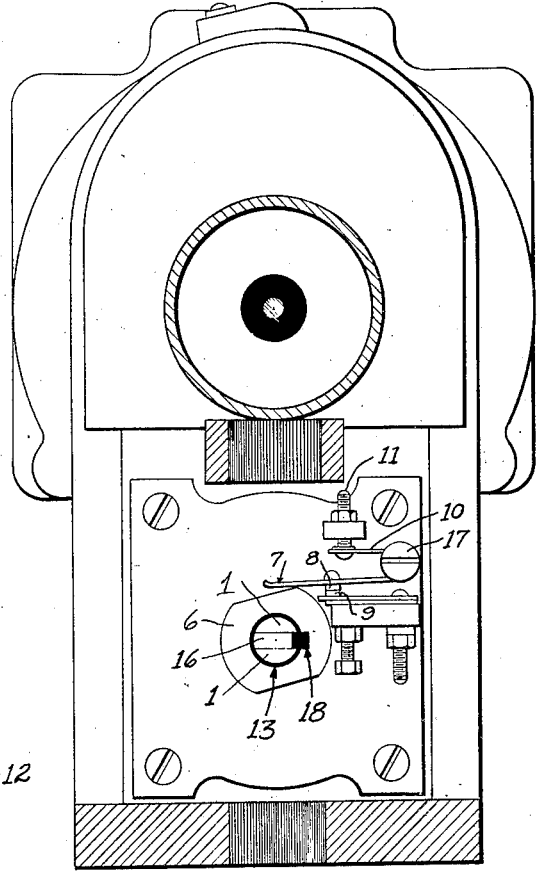
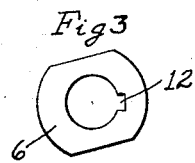
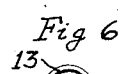
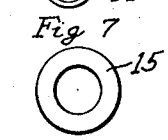
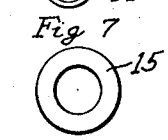
INVENTOR
Avery E. Brown
BY Frank C. Curtis
ATTORNEY Patented July 31, 1928.

1,679,069

UNITED STATES PATENT OFFICE.

AVERY E. BROWN, OF PITTSFIELD, MASSACHUSETTS, ASSIGNOR TO BERKSHIRE MAGNETO CO., OF PITTSFIELD, MASSACHUSETTS, A CORPORATION OF MASSACHUSETTS.

MAGNETO-ELECTRIC MACHINE.

Application filed January 19, 1920. Serial No. 352,498.

Reference may be had to the accompanying drawings, and the reference characters marked thereon, which form a part of this specification. Similar characters refer to similar parts in the several figures therein.

This invention is applicable to various kinds of magneto-electric machines, and is particularly adapted for high tension magneto-electric machines of the general type shown and described in U. S. Letters Patent No. 943,697, dated December 21, 1909, No. 958,754, dated May 24, 1910, granted to Theodore M. Mueller, and Reissue No. 14,181, dated August 15, 1916, granted to J. B. Frawley, for magneto-electric machines, to which patents reference may be had for a more full understanding of the present invention.

Machines of the type shown in these several patents, are inductor alternators having a stationary magnetic field and a stationary armature coil with a rotor which acts as an inductor distributing the flux from the field through the armature coil in alternating directions, one or more times for each revolution of the rotor. They employ a current-interrupter-mechanism in which the flow of current from the current-generating-mechanism through the primary coil is broken or interrupted at frequent intervals.

It is a well recognized fact that in this class of machines there are stray magnetic fluxes and stray electric currents. In this type of machine any metallic part may form part of a structural path along which stray electric currents may flow unless controlled. What I mean by a structural path is a part of the mechanical construction of the machine composed of materials which are electrical conductors. In the type of machines above referred to the ordinary location of the point of contact between the circuit-breaking member and the actuating member therefore, with respect to the other parts of the machine is such that a stray or parasitic current will tend to flow through said point of contact. These parts become members of a structural path as above stated. This path may be traced as follows: Starting from the current interrupter member through its ground connection to the frame of the machine, through the frame to bearing No. 2, thence to the shaft, along the shaft to the actuating member. This path which would form a closed electric circuit while the actuating member is in contact with the current interrupter member is interlinked with the full magnetic flux of the machine twice in each revolution, or in other words cuts the lines of force four times in each revolution, of the armature. Without the insulation an objectionable current will flow in this circuit reducing the output of the machine and injuring the contact surfaces of the current interrupter member and actuating member.

It has been found unsatisfactory to overcome this objectionable feature by making one or both of the contacting members of nonconductive material because such material does not have the advantages of accuracy and resistance to wear which can be obtained by a metal to metal contact.

The principal object of the present invention is to provide for a metal-to-metal contact between the current-interrupting member and the member which actuates the same, while at the same time preventing the passage of stray currents through their point of contact.

Other objects will appear in connection with the following description.

Fig. 1 of the drawings is a view in side elevation partly broken away and shown in central vertical longitudinal section of a high-tension magneto-electric machine embodying my invention.

Fig. 2 is a vertical cross section of the same taken on the broken line 2—2 in Fig. 1.

Fig. 3 is a side view of the cam for actuating the circuit-interrupting member.

Fig. 4 is a view in perspective of the key of insulating material for holding said cam in proper rotative position on the cam-supporting shaft.

Fig. 5 is a view in perspective of the wedge whereby the slotted cam-supporting shaft is expanded.

Fig. 6 is an end view of the bushing-sleeve of insulating material whereby the cam is insulated from its supporting shaft.

Fig. 7 is a plan view of the collar which is mounted upon the cam-supporting shaft between the cam and the neighboring bearing for the shaft.

Referring to the drawings wherein the invention is shown in preferred form, 1 is a shaft rotatively mounted in bearings, 2 and 3, on the casing of the machine.

On this shaft is mounted the inductor, 4, of the current-generating apparatus.

The inner end of the shaft, 1, projects beyond the bearing, 3, and is slotted as shown at 5. The portion of this end of the shaft, 1, which projects beyond the bearing, 3, is reduced in diameter and has mounted thereupon a cam, 6, which is adapted to engage the movable member, 7, of the circuit-interrupter-mechanism, and at frequent intervals in the operation of the machine to actuate said member, 7, to cause the contact point, 8, thereon to be separated from the contact point, 9, to which the electric current is transmitted from the current-generating-mechanism. The interrupting-member, 7, is mounted upon a screw-post, 17 and constitutes one arm of a U-shaped metal spring, the other arm, 10, of which is engaged by an adjusting screw, 11, whereby the tension of the spring can be regulated. This spring is grounded through the screw-post, 17 forming part of the return circuit to the generator.

The cam, 6, is keyed to the shaft, 1, by means of a key, 18, of insulating material which simultaneously engages an end portion of the slot, 5, in the shaft, 1, and a key-slot, 12, in the cam.

Interposed between the cam and the reduced end of the shaft, 1, is a bushing-sleeve, 13, formed of insulating material, slotted at 14, to receive the insulating key, 18.

A collar, 15, of insulating material surrounds the reduced end portion of the shaft, 1, between the cam, 6, and the neighboring bearing, 3.

The cam is secured upon the reduced end of the shaft, 1, by means of a metal wedge, 16, which occupies the remaining end portion of the slot, 5, in the shaft, 1.

This wedge is driven tightly into the slot, 5, and is of such dimensions that it expands the slotted end of the shaft, 1, compressing the bushing, 13, against the cam, and at the same time engages the key, 18, and holds the same securely in the key slot, 12, in the cam.

The cam is thus securely held upon the shaft while its relative rotative position thereupon is accurately determined and maintained by the key, 18.

The cam, 6, is made of metal and has a metal-to-metal contact with the interrupter-member, 7, but no stray currents can pass through the point of contact between the cam and interrupter-member, because by reason of the insulating key, 18, bushing, 13, and collar, 15, the cam is electrically insulated from the shaft, 1, as well as from all other parts of the device which are in electrical connection with said interrupter member. I thus obtain all the advantages of metal-to-metal contact between the cam and the interrupter-member without providing a path for stray currents through their point of contact.

I do not wish to be limited to the details of construction shown in the drawings and above particularly described, as various changes can be made in the form and arrangement of the parts without departing from the spirit of my invention.

The current-generating mechanism while preferably of the type shown in said Patent No. 943,697, may for certain purposes of the invention be of any known form.

I have shown and described in detail only such parts of the machine as are necessary to an understanding of the nature and objects of my invention. For a further understanding of the construction and manner of operation of the machine, reference may be had to the several prior patents above referred to.

What I claim as new and desire to secure by Letters Patent is:

1. In a machine of the class described a current interrupter-member, and an actuating member engageable with said current-interrupter member by metal-to-metal contact, one of said members being movable relatively to the other, to obtain current interrupting actuation of said current-interrupter member, one of said members being electrically insulated from other parts of the machine which are in electrical connection with the other of said members, and a connection between said other member and the ground.

2. In a machine of the class described a current-interrupter-member, spring-actuated in one direction, and a movable member engageable therewith by metal-to-metal contact for actuating said current-interrupter-member in the opposite direction, one of said members being electrically insulated from other parts of the machine which are in electrical connection with the other of said members, and a connection between said other member and the ground.

3. In a machine of the class described a current-interrupter-member, and an actuating cam-member engageable therewith by metal-to-metal contact, one of said members being electrically insulated from other parts of the machine which are in electrical connection with the other of said members, and a connection between said other member and the ground.

4. In a magneto-electric machine including a plurality of current generating members and in combination, a rotatory shaft carrying one of the current-generating members, said shaft having a slotted end extending beyond one of its bearings; a metal cam on the slotted end of the shaft, an insulating bushing between said cam and shaft; an insulating collar surrounding said shaft between said cam and said bearing; a key of insulating material inserted in a portion of the slot in the shaft and also in a slot provided therefore in said bushing and cam; and a wedge seated in another portion of the slot whereby the slotted end of the shaft is expanded to secure the bushing upon the shaft.

5. In a magneto-electric machine including a plurality of current generating members and in combination, a rotatory shaft carrying one of the current-generating members, said shaft having a slotted end extending beyond one of its bearings; a metal cam on the slotted end of the shaft, an insulating bushing between said cam and shaft; an insulating collar surrounding said shaft between said cam and said bearing; a key of insulating material inserted in a portion of the slot in the shaft and also in a slot provided therefore in said bushing and cam; and a wedge seated in and filling the remaining portion of said slot whereby the slotted end of the shaft is expanded to secure the bushing and cam to the shaft and the key in its seat.

6. In a machine of the class described a current interrupter-member, and an actuating member engageable with said current-interrupter member by metal-to-metal contact, one of said members being movable relatively to the other to obtain current interrupting actuation of said current-interrupter member, one of said members being electrically insulated from other parts of the machine which are in electrical connection with the other of said members, and a connection between said other member and the ground, said machine having a structural path including the interrupter member and its actuating member in such relation with the magnetic circuit of the machine as to cause a definite induced voltage in said path.

7. In a machine of the class described, a current interrupting member made of metal, an actuating member, said members being engageable and having metal-to-metal contact, said actuating member being movable relatively to said current-interrupting member to impart current interrupting actuation to the latter, said actuating member being electrically insulated from all parts of the machine which are in electrical connection with the current interrupting member, and a connection between said current interrupting member and the ground.

AVERY E. BROWN.